June 7, 1966      C. A. ESCOFFERY      3,255,047

FLEXIBLE FABRIC SUPPORT STRUCTURE FOR PHOTOVOLTAIC CELLS

Filed Sept. 7, 1961      4 Sheets-Sheet 1

INVENTOR.
CHARLES A. ESCOFFERY
BY
OSTROLENK, FABER, GERB & SOFFEN
ATTORNEYS

June 7, 1966     C. A. ESCOFFERY     3,255,047
FLEXIBLE FABRIC SUPPORT STRUCTURE FOR PHOTOVOLTAIC CELLS
Filed Sept. 7, 1961     4 Sheets-Sheet 2

INVENTOR.
CHARLES A. ESCOFFERY
BY
OSTROLENK, FABER, GERB & SOFFEN
ATTORNEYS

June 7, 1966  C. A. ESCOFFERY  3,255,047
FLEXIBLE FABRIC SUPPORT STRUCTURE FOR PHOTOVOLTAIC CELLS
Filed Sept. 7, 1961  4 Sheets-Sheet 3
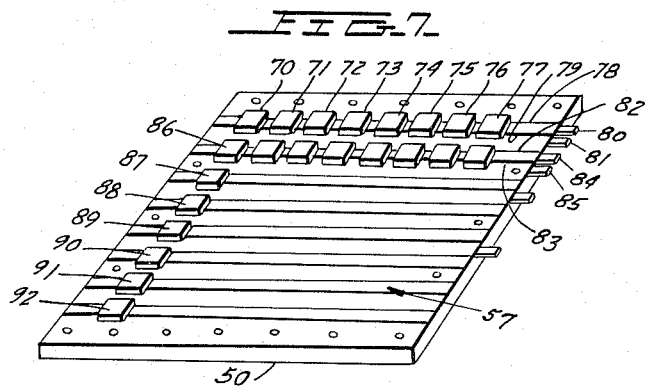
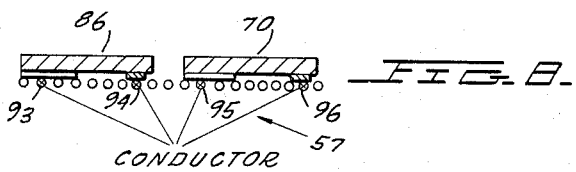
CONDUCTOR
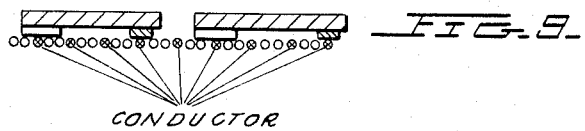
CONDUCTOR
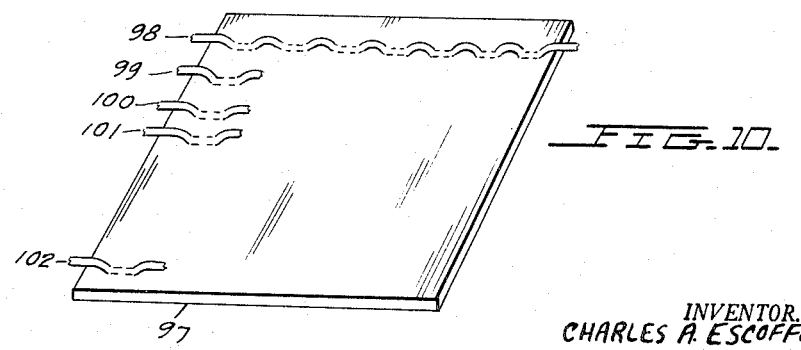
INVENTOR.
CHARLES A. ESCOFFERY
BY
OSTROLENK, FABER, GERB & SOFFEN
ATTORNEYS June 7, 1966   C. A. ESCOFFERY   3,255,047
FLEXIBLE FABRIC SUPPORT STRUCTURE FOR PHOTOVOLTAIC CELLS
Filed Sept. 7, 1961   4 Sheets-Sheet 4
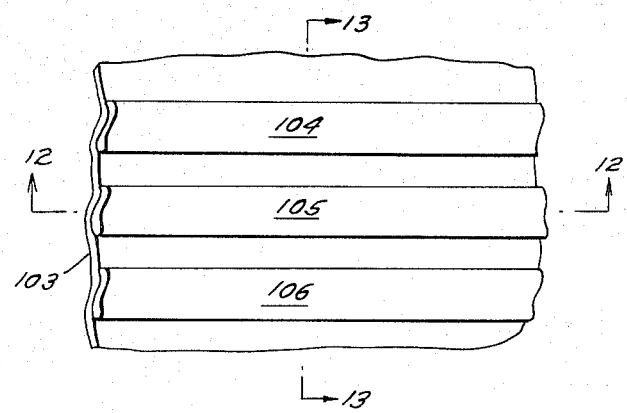
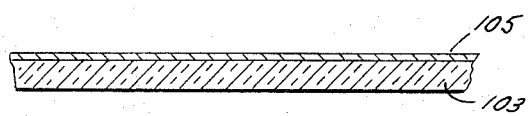
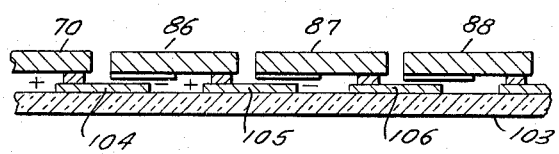
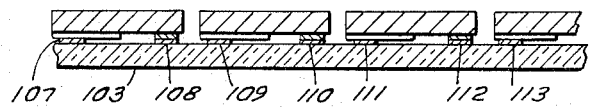
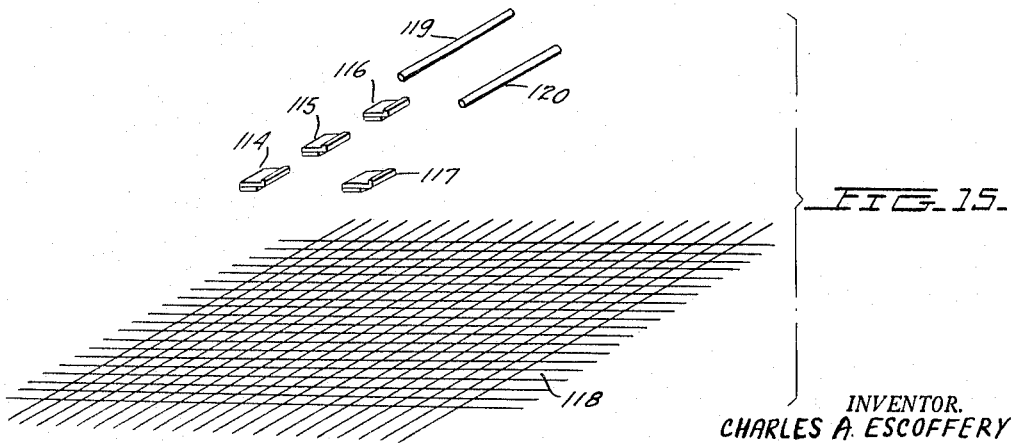
INVENTOR.
CHARLES A. ESCOFFERY
BY
OSTROLENK, FABER, GERB & SOFFEN
ATTORNEYS

United States Patent Office 3,255,047
Patented June 7, 1966

3,255,047
FLEXIBLE FABRIC SUPPORT STRUCTURE FOR PHOTOVOLTAIC CELLS
Charles A. Escoffery, Los Angeles, Calif., assignor to International Rectifier Corporation, El Segundo, Calif., a corporation of California
Filed Sept. 7, 1961, Ser. No. 136,628
3 Claims. (Cl. 136—89)

My invention relates to a novel support structure for photovoltaic cells which is light in weight and carries electrical connecting means therein for connecting various cells in predetermined circuit relationship with one another.

It is common practice to interconnect a plurality of photovoltaic cells in predetermined circuit relation with one another for achieving some predetermined power requirement of an electrical system. By way of example, a first group of cells may be connected in parallel for obtaining a high current output and various of these groups are then connected in series for an increased voltage output so that a relatively high voltage, high current requirement can be satisfied by the bank of cells.

In mounting such cells, it is highly desirable first that the mounting be as simple as possible so that large banks may be economically formed as where a bank can include many hundreds of individual cells. It is further desirable that the structure be flexible because of the fragile nature of the cells whereby the cells are mechanically isolated from one another through the flexible medium, although they are electrically connected to one another. It is additionally desirable that the cells have a maximum of their active surface exposed to incident radiation.

As an additional requirement, the mounting structure should be as light-weight as possible. The weight requirement is of great importance in applications such as for powering of space vehicle instruments or airborne equipment.

In the prior art, many types of mounting structures for a plurality of cells are known. One widely used system is to provide a mounting base and to then "shingle" adjacent cells with respect to one another on the base. This is done where the cells have a first electrode at their rear and a second electrode at their top and photosensitive surface. In the "shingling," the rear electrode of a first cell is placed on the top electrode of a second cell, and so on, to form the complete chain of cells which are connected in series. Other shingle-connected paths may then be further connected in series or parallel with one another to subsequently achieve the voltage and current requirements of the system. In such an arrangement, the cells are rigidly mechanically connected to one another so that if there is a flexing of the mounting support, there will be a possible breakage of some of the cells since they are not mechanically isolated from one another, but form a rigid chain. Furthermore, the assembly itself requires a relatively complex soldering operation.

Finally, the "shingling" will cause a decrease in the maximum surface area that can be made available to incident radiation. This decrease is due first because a top electrode obscures a portion of the possible photosensitive surface of the cell, and secondly, because a "shingled" cell can shade the next adjacent cell.

In accordance with the present invention, I provide a novel support structure which is flexible, light in weight, inherently provides electrical conductors for interconnecting the various cells of the bank for simplifying the electrical connection between the various cells, and permits a maximum photo-sensitive area of the cell to be exposed to incident radiation.

In one embodiment of the invention, the support may take the form of a woven material wherein the warp and woof of the material is composed of threads of insulation material, while the woof, for example, will include threads of conductive material at spaced intervals.

The conductors in the woof are preferably spaced in such a manner that when a photovoltaic cell is laid on top of the cloth and has its both electrodes on the rear surface, as described in my copending application Serial No. 137,165 filed September 11, 1961 entitled "Electrode Arrangement for Solar Cells," and assigned to the assignee of the present invention, the electrodes will be in registry with appropriate conductors of the woof and can be directly electrically secured thereto as by soldering. This will mechanically secure the cell to the cloth-type surface.

The next photovoltaic cell is then spaced from the first and is appropriately soldered to the same conductive strands as the first where the two cells are to be placed in parallel. The complete array of photovoltaic cells is then secured to the cloth in this manner with the selected conductive strands being later interconnected with one another to achieve predetermined electrical arrays.

It will be immediately apparent that this novel structure can be light in weight, and that the soldering operation can be simply performed. It will be further apparent that the maximum area of the photo-sensitive surface of the cells is exposed to radiation, since all of the cell surfaces will lie in the same plane. Moreover, the cells are mechanically isolated from one another since they are mechanically connected to each other only through the flexible cloth so that flexing of the cloth will not transmit mechanical stress to any of the cells to cause cell breakage.

It will also be apparent from the foregoing that the conductive elements could be in the warp rather than in the woof, and further, that conductive strands may be in both warp and woof, being appropriately insulated at their intersections. Such a construction could be had by using insulated conductors and removing the insulation from only those portions of the insulating conductors which are to receive cells prior to securing the cells to the cloth support. In this manner, a great number of desirable arrays of cells (series-parallel connections of cells) can be achieved.

In a further embodiment of the invention, the flexible support could be comprised of a thin flexible plastic body having conductive strips on the surface thereof which strips serve the purpose of the conductive strands in the cloth-type fabric described above.

Alternatively, a glass cloth can be used with the conductive strands sewed into the cloth.

As a final example of the invention, and for use with solar cells having one electrode on the rear, and one on the top, a simple wire gauze can be used wherein the rear electrode of each of the solar cells is soldered directly to this gauze. The top electrodes can then be connected to one another as by conductive wires soldered to these top electrodes to form a sub-group of parallel connected cells. This sub-group can be subsequently connected in series or parallel with other sub-groups of cells formed in an identical manner. The individual wire gauze sheets can be assembled directly on a glass cloth main support in this embodiment.

Accordingly, a primary object of this invention is to provide a novel support for a plurality of photovoltaic cells.

Another object of this invention is to provide a novel support for photovoltaic cells which is flexible and light in weight.

A further object of this invention is to provide a novel support for photovoltaic cells which inherently provides electrical connecting means for electrically interconnecting the various cells.

Yet a further object of this invention is to provide a novel support for photovoltaic cells which permits a maximum amount of the surface of the cell to be exposed to incident radiation.

Another object of this invention is to provide a novel support structure for photovoltaic cells wherein the cells are mechanically isolated from one another and are electrically interconnected to one another.

A further object of this invention is to provide a thin flexible body having continuous conductors supported therefrom for mechanically supporting a plurality of photovoltaic cells and for electrically interconnecting said cells through the continuous conductors.

These and other objects of my invention will become apparent from the following description when taken in connection with the drawings, in which:

FIGURE 7 illustrates in perspective view the manner in which photovoltaic cells are mounted on a fabric of the type shown in FIGURE 6 when assembled with the frame support.

FIGURE 8 is a side cross-sectional view of a portion of the fabric of FIGURES 6 and 7 and illustrates the manner in which photovoltaic cells are electrically connected to the conductor strands in the cloth.

FIGURE 9 shows an alternative arrangement of the conductor strands in the cloth of FIGURES 6 and 7.

FIGURE 10 shows a further embodiment of the flexible support body wherein a conductive wire is sewed into a glass cloth body.

FIGURE 11 illustrates in perspective view an alternate embodiment of the invention wherein a thin plastic sheet having exposed conductive segments on its surface is used as the support.

FIGURE 12 is a side cross-sectional view of the sheet of FIGURE 11 taken across the lines 12—12 in FIGURE 11.

FIGURE 13 is a side cross-sectional view of FIGURE 11 taken across lines 13—13 in FIGURE 11, and illustrates the manner in which the elongated conductive portions of the sheet can receive solar cells.

FIGURE 14 shows a modification of FIGURE 13.

FIGURE 15 illustrates an exploded perspective form of the manner in which a wire gauze can be used to receive a plurality of cells which have one electrode on their rear surface and another electrode on their front surface.

Referring first to FIGURES 1a through 1f, I show therein the steps in manufacturing the novel photovoltaic cell which has its both electrodes at the rear surface of the cell. In the description of FIGURES 1a through 1f I have selected an N-type body of silicon as the semi-conductor material, and thereafter describe the manner in which a P-type layer is applied to the silicon to render it photo-sensitive. It will be apparent, however, to those skilled in the art that the invention is not limited to the use of an N-type silicon body. Thus, a P-type body can be used with an N-type layer being formed by an appropriate diffusion process such as one using an phosphorus doping medium. In a like manner the semi-conductor material could have been chosen to be germanium rather than silicon, or any other appropriate semi-conductor material.

Figure 1A:
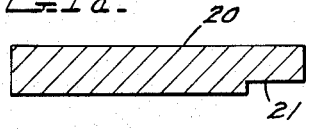
FIGURES 1a through 1f illustrate the method of manufacture of a novel photovoltaic cell having its both electrodes on the rear surface of the cell which is that surface away from the photo-sensitive surface of the cell.

In FIGURE 1a, the process begins with a body 20 of N-type silicon which may be square in shape and will have a relatively small thickness, all dimensions herein being exaggerated for purposes of clarity. The wafer 20 is prepared in the usual manner well known to those skilled in the art.

A groove 21 is first prepared in the lower surface of the body in any manner as by etching, the lapping process being chosen for purposes of illustration.

Figure 1B:
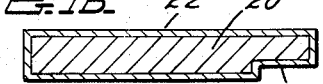

The next step of the process, as shown in FIGURE 1b, is the formation of a P-type layer 22 around N-type body 20, this layer having an appropriate thickness for rendering at least the upper surface of wafer 20 photo-sensitive. The P-type layer 22 can be formed in any manner well known to those skilled in the art, as, for example, by exposing wafer 20 to boron trichloride or boron oxides, and thereafter diffusing the boron into the surface of wafer 20 in a high temperature furnace at a temperature of approximately 1,000° C. until the thickness of layer 22 is at an appropriate value. Such diffusion processes are well known to those skilled in the art, and need not be described in any detail here.

Figure 1C:

After the P-type layer has been formed, the lower surface and left-hand side of wafer 20 is removed as by lapping or grinding or mechanical abrasion to remove the P-type layer from the left-hand side of wafer 20, and from the bottom portion of wafer 20 to the left of groove 21 so that the resultant wafer will have the appearance shown in FIGURE 1c. This operation is well known and need not be described in detail here.

Figure 1D:
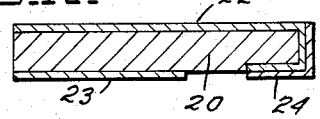

Thereafter, the wafer of FIGURE 1c is masked so that only the right-hand side of the wafer, a portion of the rear surface of the wafer of N-type material, and the rear P-type layer are exposed. The masked wafer is then immersed in a nickel-plating solution, for example, so that nickel coatings 23 and 24 are formed on the wafer, as shown in FIGURE 1d where nickel-plating 23 makes contact with the N-type body 20, while nickel-plated portion 24 makes contact with the P-type region 22. Other plating solutions could also be used such as gold or rhodium.

It is to be noted that I have purposely obscured the P-type layer portion at the right-hand edge of the cell in the step of FIGURE 1d by plating over that portion. This is done to prevent localized high resistance areas when the incident radiation does not strike this portion of the cell and thus could decrease the efficiency of the cell.

The nickel-plated portions 23 and 24 are thereafter tinned or coated with solder portions 25 and 26 respectively to permit low ohmic connection to the nickel-plated portions. Moreover, and since the nickel plate is thin and of relatively high resistivity, the solder increases the efficiency of the cell as well as improving the electrical conductivity of contacts made to the cell.

Figure 1E:
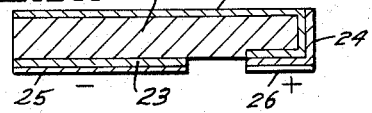

The resultant novel cell of FIGURE 1e is then seen to have its both electrodes 25 and 26 on the rear surface of the cell, or that surface of the cell which is away from the photo-sensitive surface 22 of the cell.

Figure 1F:
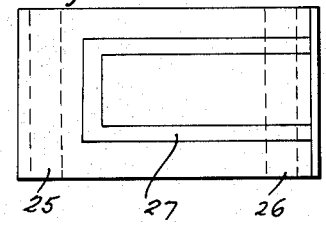

A top view of the cell is shown in FIGURE 1f. Referring to FIGURE 1f, it is seen that collecting grid 27 may be applied to the upper surface 22 of the cell and in contact with nickel-plating 24 to increase the current-collecting ability of the cell in the manner described in U.S. patent application Serial No. 859,375 filed December 14, 1959, now Patent No. 3,053,926, entitled "Silicon Photo-Electric Cell" and assigned to the assignee of the present invention. The grid is very narrow and is not to scale in FIGURE 1f. Also, many types of configurations for the grid are possible. The grid can be applied by vacuum evaporation of aluminum (for a P-layer) as well as the techniques of the above application.

With the novel cell of FIGURES 1e and 1f, the terminals 25 and 26 are accessible from the rear of the cell so that the cell can now be very easily mounted to various types of novel support structures. That is to say, the rear configuration of both terminals permits mounting to a flat surface which has integral therewith electrical conductors which can extend between various adjacent cells which are to be electrically interconnected.

Moreover, the maximum possible area of the sensitive top surface is exposed to incident radiation.

Figure 2A:
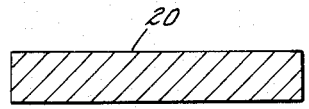
FIGURES 2a through 2c illustrate an alternate method which can replace the steps shown in FIGURES 1a through 1c.
Figure 2B:
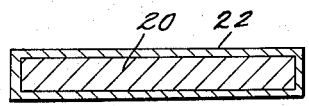
Figure 2C:
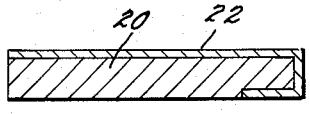

As an alternate method of manufacture of the cell of FIGURES 1e and 1f, and as shown in FIGURES 2a through 2c, the process can start with a square wafer 20 of FIGURE 2a which is not grooved as was the case in the step of FIGURE 1a. The P-type layer 22 is then applied to the square wafer to the usual thickness which could, for example, be 0.0001 inch, and those P-type layer portions which are to be eliminated can be eliminated by appropriately masking the wafer and removing the undesired regions, as shown in FIGURE 2c. The electrodes are then connected to the wafer of FIGURE 2c in the manner already described to achieve the resulting device having both electrodes on the rear of the cell.

Figure 3A:
FIGURES 3a and 3b illustrate a further method of manufacture of a photovoltaic cell having its both electrodes accessible at the rear of the cell.

As a further embodiment of the invention, and in order to modify an existing photovoltaic cell made according to prior techniques, it is possible to take the normally top positioned electrode and electrically connect it to the rear of the cell. In FIGURE 3a I have shown a typical prior art type of cell which is comprised of a wafer 30 of N-type silicon having a P-type layer 31 on the surface thereof. The P-layer has a nickel-plated layer 34 thereon while the N-type wafer has a nickel plated layer 33 thereon. Each of layers 33 and 34 are then dipped in solder and are coated with solder layers 32 and 34 respectively to which low resistance contact may be made.

Figure 3B:
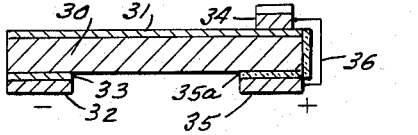

In accordance with the present invention, an insulating layer 35a of any appropriate material is deposited on the rear surface and right hand edge of wafer 30 as shown in FIGURE 3b. A conductive electrode 35 is secured to this insulating layer. An electrical jumper 36 is thereafter connected between contact 34 and electrode 35 so that both the positive and negative electrodes 35 and 32 respectively are now accessible from the rear surface of the cell, the jumper 36 resting directly on insulation 35a.

Figure 4A:
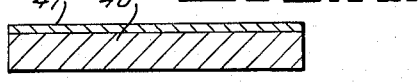
FIGURES 4a through 4c illustrate another embodiment of the novel method of manufacture of a photovoltaic cell having its electrodes accessible at the rear of the cell.
Figure 4B:
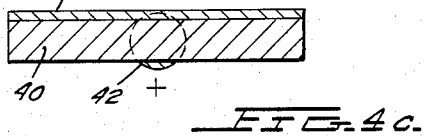
Figure 4C:
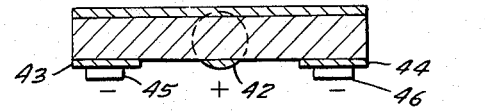

A still further embodiment of a novel solar cell having all of its electrodes accessible from the rear of the cell is shown in FIGURES 4a through 4c. Referring first to FIGURE 4a, a sample of, for example, N-type silicon 40 is provided with a P-type upper surface 41 in the usual manner. Thereafter, electrode strip 42 of aluminum or a group III containing material is laid across the center of the bottom surface of the wafer and the assembly is placed in a furnace of appropriate, controlled atmosphere and the temperature is increased to cause the material of strip 42 to alloy into the body 40 of N-type silicon. Where an aluminum wire is used, the temperature could be of the order of 700 to 750° C. and would be retained for a time depending on the thickness of the wafer. The alloying process is so controlled that the group III material is caused to diffuse completely through body 40, as illustrated in dotted lines in FIGURE 4b, until the group III material engages the P-type layer 41. Instead of using a strip 42, one or more aluminum wires (or their equivalent) where points press against the lower surface of wafer can be used. Upon heating, the wire or wires alloy into the silicon and directly through the wafer 40 to establish contact with the P-layer 41.

The recrystallized silicon around the silicon forms a P layer which prevents short circuiting of the N layer.

The direction of diffusion can be controlled by controlled localization of temperature, with some spreading in a direction perpendicular to the preferred direction of diffusion. The technique is particularly useful when the silicon layers are used.

Clearly, this technique can also be used with a P-type body with the strip being formed of arsenic or other appropriate group V material, or a metal containing a group V material which alloys through the P body to contact an N-type surface layer.

Thereafter, nickel-plating portions 43 and 44 are connected to the N-type silicon body 40 at either edge and receive solder portions 45 and 46 in the usual manner. Thus, the resulting device of FIGURE 4c will have a central positive electrode 42, and two external negative electrodes 45 and 46 disposed about positive electrode 42, all of electrodes 42, 45 and 46 being accessible from the rear of the wafer.

In order to mount a plurality of solar cells to a mounting structure, and to electrically interconnect this plurality of cells, the feature of having both electrodes on the rear surface of the cell can be taken in novel combinations with various types of mounting structures.

Figure 5:
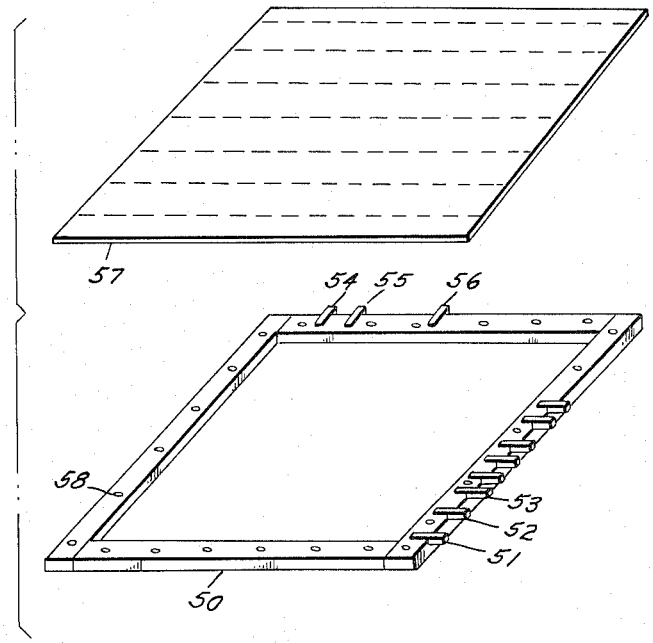
FIGURE 5 illustrates a frame structure for receiving a novel cell mounting support of a flexible medium.

In a first embodiment of the novel combined cell and mounting structure therefor, as set forth in FIGURE 5, a mounting frame such as frame 50 may be provided, as shown in FIGURE 5, which is formed, for example, of members of insulating material. As will become apparent hereinafter, the mounting frame such as frame 50 can have any desired shape or configuration. Along one edge of frame 50 there are disposed a plurality of electrical terminal members such as electrical terminals 51, 52 and 53 which are, for example, rigidly embedded in the material of frame 50 and have protruding ends capable of receiving electrical leads. In a like manner, another side of frame 50 could have terminal members such as terminal members 54, 55 and 56.

While I have only shown a portion of the terminal members 51 through 53 and 54 through 56, it will be noted that these terminal members can be equally spaced along the full length of the frame member 50.

A fabric-like material 57 shown in exploded view in FIGURE 5 preferably has a dimension suitable to cover the complete frame 50, and may be secured to the frame 50 in any desired manner as by insulated rivets which pass into openings around frame 50 such as opening 58, and the fabric-like, light-weight support member 57.

Figure 6:
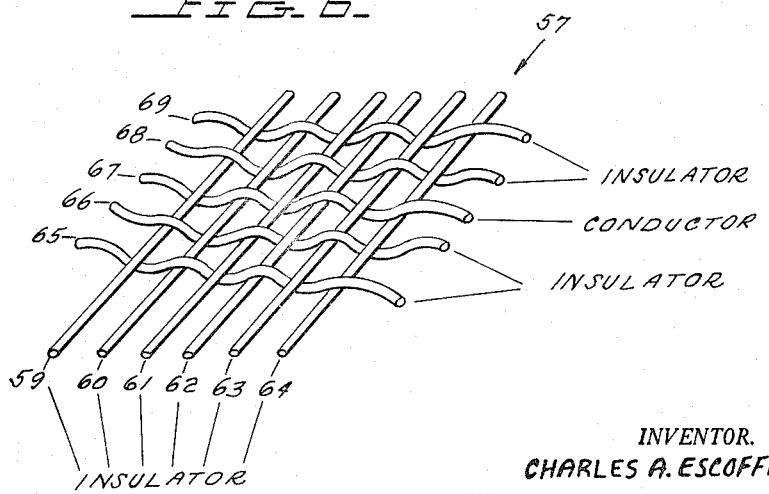
FIGURE 6 is an enlarged perspective view of a portion of a cloth mounting body having a conductor in the woof.

A small portion of fabric-like member 57 is shown in exploded perspective view in FIGURE 6 to illustrate the manner in which it is woven. In FIGURE 6, the warp threads 59, 60, 61, 62, 63 and 64 are of some desired insulation material, and could, for example, be glass threads, nylon threads or Teflon threads.

The woof threads of fabric 57, as shown in FIGURE 6, include threads 65, 66, 67, 68 and 69 where the threads 65, 66, 68 and 69 are of insulation material as were threads 59 through 64, whereas thread 67 is of a conductive material and may, for example, be a copper wire having a diameter equal to the diameter of the other threads.

In forming the complete fabric sheet, conductive threads such as thread 67 will be placed in the sheet parallel to thread 67 at predetermined spacings which could, for example, be equal to the spacing of the rear electrodes of a solar cell. The spacing of these conductive threads or strands will be discussed more fully hereinafter. It is to be further noted that in certain applications of the novel invention, and in addition to having spaced conductor threads in the woof of the fabric, it may also be possible that the conductive strands can be only in the warp or in both the woof and warp with the intersections of the conductors in both woof and warp being an insulated intersection.

In FIGURE 7 I have shown the fabric 57 formed, as shown in FIGURE 6, as being secured to frame 50, and I have further shown a plurality of solar cells attached to the fabric 57. More specifically, in FIGURE 7, a complete bank of solar cells will have a total of 64 solar cells, only two ranks and one file of cells having been shown for purposes of clarity. Each rank of cells such as cells 70, 71, 72, 73, 74, 75, 76 and 77 is positioned so that their first rear electrode lies in alignment with conductive strand 78, while their other rear electrode lies in alignment with conductive strand 79.

When the fabric 57 is placed on frame 50, the conductive strands such as conductive strands 78 and 79 are electrically connected to terminals 80 and 81 respectively which extend from frame 50. In a like manner, the other appropriately spaced conductive strands in fabric 57 are secured to respective terminals as by soldering, this being further illustrated for the conductive strands 82 and 83 which are soldered to terminals 84 and 85 respectively for the second rank of cells. Clearly, each of the ranks are similarly formed, as described above where each rank will include solar cells 70 and 86 through 92 respectively.

In forming the complete bank, the solar cells of the bank are at one and the same time mechanically connected to the support fabric 57 and electrically interconnected with respect to one another. Thus, as shown in FIGURE 8 which shows a cross-sectional view through the fabric for the two cells 70 and 86, the fabric 57 has conductive strands 93 and 94 spaced by the spacing of the rear electrodes of cell 86, while in a similar manner conductive strands 95 and 96 are spaced by the spacing of the electrodes of cell 70. It will be obvious that the remaining fabric will have similarly spaced conductive strands for the remaining ranks of the cells of FIGURE 7.

Once the cells, such as cells 70 and 86, are laid on top of the fabric, they can have a strip of solder-type material interposed between the conductive strand and their electrode. Heat may then be applied from beneath the fabric 57 as by touching a soldering iron, for example, to conductive strand 93 adjacent the left-hand electrode of cell 86. This will cause the solder material to flow, and thus both electrically connect the electrode to the conductive strand and mechanically connect the cell to the fabric 57. Each of the electrodes of the cells is secured to the fabric in a similar manner.

As a result of this operation, there is mechanical and electrical connection of the cells to the fabric and, in addition, there is electrical interconnection between the various cells.

With regard to the mechanical connection, it will be noted that the individual cells are mechanically isolated from one another since they are connected mechanically to one another only through the fabric material which is exceedingly flexible. With regard to the electrical connection and referring to FIGURE 7, the full rank of cells 70 through 77 may be automatically connected in parallel where electrodes of the same polarity engage the same conductive strand. Indeed, all of the ranks will be ranks of parallel connected elements without further electrical interconnection being made between the cells. Thereafter, and, for example, if the various ranks are to be connected in series so as to achieve a high voltage rating for the complete bank, the series connection may be made merely by appropriately connecting the terminals of the conductive strands such as terminals 80, 81, 84 and 85 in appropriate electrical circuit relationship.

The flexibility of this electrical connection of the complete bank is further apparent when it is realized that the terminals of the conductive strands could also be electrically connected so that various of the ranks can be connected in parallel rather than series, so that a wide range of voltage and current outputs is available from the banks of cells secured to fabric 57.

In addition to all of this, the further advantage will become apparent wherein the efficiency of each of the individual cells is at a maximum, since the maximum surface area of the cell is exposed to incident radiation. That is to say, one cell will not shade an adjacent cell as will occur in a "shingling-type" support, and the cells are not provided with electrodes on their upper surface which also cuts down the maximum effective photo-sensitive surface area.

The fabric as shown in FIGURE 8 has conductive strands spaced in accordance with the spacing of the electrodes of the cells, and in accordance with the spacing of the cells from one another (strands 94 and 95 are spaced in accordance with the spacing between the cells). In FIGURE 9, the spacing of the strands is symmetric, and the strands are closer to one another so that the fabric can be more economically made. Thus, in FIGURE 9, every third strand is a conductor so that the electrode of the cell will inherently engage one of these strands when it is positioned on the fabric, even though it may be slightly off position.

While the fabric 57 of FIGURES 7, 8 and 9 requires that the conductive members for conductive strands be woven into the fabric when the fabric is made, as shown in FIGURE 10, a presently available glass cloth 97 can be used, and conductive wires such as wires 98 and partially shown wires 99, 100, 101 and 102 are then sewn into the fabric, as schematically illustrated. Those portions of the conductive strands 98 through 102 which extend above the top surface of fabric 57 are then accessible for electrically and mechanically receiving solar cells in the manner described in FIGURES 7, 8 and 9.

Alternative to the use of a fabric-type material, a lightweight, flexible material in the form of an exceedingly thin plastic sheet can be used which has continuous conductive members along the surface thereof.

Referring to FIGURES 11, 12 and 13, an exceedingly thin sheet of plastic material 103 which could, for example be Teflon, has elongated copper conductors such as conductors 104, 105 and 106 on the surface thereof.

Such a metallized fabric as shown in FIGURES 11, 12 and 13 are well known as flexible metallized fabrics used, for example, in printed circuit applications wherein the conductive strips 104, 105 and 106 may be deposited on the surface of insulating sheet 103 by any standard copper depositing method. In a similar manner, flexible copper-clad Teflon films are available, and these could be utilized by appropriately etching away copper to only leave the elongated strips 104, 105 and 106.

The solar cells are then, as best shown in FIGURE 13, secured to the copper strips such as strips 104, 105 and 106, in the same manner as above described in FIGURES 7, 8 and 9. Thus, in FIGURE 13, solar cells 70, 86, 87 and 88 have their electrodes appropriately secured to conductors 104, 105 and 106.

It will be noted that where each of the ranks of FIGURE 7 are to be series connected, the same conductors 104, 105 and 106 can operate to receive adjacent electrodes of the cells of adjacent ranks.

Thus, in FIGURE 13 the positive electrode of cell 70 and the negative electrode of cell 86 are each mechanically and electrically secured to conductor 104. In a like manner, the positive electrode of cell 86 and the negative electrode of cell 87 are mechanically and electrically secured to conductor 105. In a similar manner, each of the other cells share a common electrode connector.

If a circuit offering more possible combinations of connections is desired, however, as shown in FIGURE 14, the copper-cladding strips of insulating film 103 may have continuous conductors such as conductors 107 through 113 which are individual to one electrode of a rank of cells.

In operation, the system of FIGURES 11 through 14 is almost identical to that of FIGURES 7 through 10. The same flexibility is achieved in the mounting support for mechanically isolating adjacent cells in view of the extreme thinness of the plastic film, it being noted in FIGURES 11 through 14 that the dimensions of the film have been substantially exaggerated for purposes of clarity.

A further embodiment of the invention is shown in FIGURE 15 for the case of solar cells having one electrode on the rear surface of the cell, and one electrode on the upper surface of the cell such as cells 114 through 117. In FIGURE 15 and as was the case of FIGURE 7, cells 114, 115 and 116 lie in a common file where other files which would include cell 117 would lie parallel to it, and in a like manner, cells 114, 115 and 116 lie in respective ranks so that an array of cells is built up in the manner of FIGURE 7.

In order to avoid "shingling" of the cells in FIGURE 15 for interconnecting them, and to avoid forming a rigid mechanical connection between the cells, and to further provide a simplified electrical connecting system for the cells, a wire screen 118 is provided for mounting the cells. This wire screen 118 is of conductive material such as copper and is cut to an appropriate shape, depending upon the number of cells which it is to carry. Each of the cells is then merely laid on top of the screen, and the rear electrode of the cells is soldered directly to the screen. This will, at one and the same time, mechanically secure the cells to screen 118 and also electrically interconnect their rear electrodes.

The top electrodes of the screen may then be electrically interconnected as by a common conductive bus such as bus 119 which is laid on top of the top electrodes of a file of cells such as the file including cells 114, 115 and 116. Similar common conductors for the other files of cells can be provided such as bus conductor 120 for the file which includes cell 117. Each of the upper buses may then be interconnected at one end so that there is a resultant sub-bank of parallel connected cells all carried from wire screen 118. A plurality of such sub-banks may be supported from a glass fabric cloth with each of the parallel connected banks being connected in series or parallel arrays to achieve some predetermined output current and output voltage for the complete banks.

Although this invention has been described with respect to its preferred embodiments it should be understood that many variations and modifications will now be obvious to those skilled in the art, and it is preferred, therefore, that the scope of this invention be limited not by the specific disclosure herein but only by the appended claims.

What is claimed is:
1. An array of photovoltaic cells, which comprises:
   (a) a first rank of photovoltaic cells disposed in parallel, aligned relation on a support member, each of said cells having first and second electrodes on the bottom surface thereof;
   (b) at least one additional rank of photovoltaic cells disposed on said support member parallel to and in alignment with said first rank of cells, the individual cells of said additional rank being constructed in like manner as, and aligned with the corresponding cells of said first rank; and
   (c) said support member comprising a thin, flexible woven fabric at least one of the warp and woof of which includes a plurality of continuous conductors,
      (1) a first and second of which conductors are electrically connected to the first electrodes of each of the cells of said first and additional ranks, respectively, and
      (2) a third and fourth of which conductors are electrically connected to the second electrodes of each of the cells of said first and additional ranks, respectively;
   said first, second, third and fourth conductors supporting said ranks of photovoltaic cells and electrically connecting the same in a predetermined circuit relationship.

2. The array of photovoltaic cells substantially as set forth in claim 1, wherein the continuous conductors are woven into the flexible fabric support structure.

3. The array of photovoltaic cells substantially as set forth in claim 1, wherein the continuous conductors are sewn into the flexible fabric support structure.

References Cited by the Examiner

UNITED STATES PATENTS

| | | | |
|---|---|---|---|
| 2,779,811 | 1/1957 | Picciano et al. | 136—89 |
| 2,962,539 | 11/1960 | Daniel | 136—89 |

WINSTON A. DOUGLAS, *Primary Examiner.*

JOHN H. MACK, *Examiner.*

J. BARNEY, *Assistant Examiner.*